(12) United States Patent
Dadheech et al.

(10) Patent No.: US 11,289,745 B2
(45) Date of Patent: Mar. 29, 2022

(54) ELIMINATION OF GASEOUS REACTANTS IN LITHIUM ION BATTERIES

(71) Applicant: GM GLOBAL TECHNOLOGY OPERATIONS LLC, Detroit, MI (US)

(72) Inventors: Gayatri V. Dadheech, Bloomfield Hills, MI (US); Li Yang, Troy, MI (US); Xingcheng Xiao, Troy, MI (US); Gongshin Qi, Troy, MI (US); Vijay P. Saharan, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 321 days.

(21) Appl. No.: 16/243,517

(22) Filed: Jan. 9, 2019

(65) Prior Publication Data
US 2020/0220234 A1    Jul. 9, 2020

(51) Int. Cl.
*H01M 10/52* (2006.01)
*B01J 37/02* (2006.01)
(Continued)

(52) U.S. Cl.
CPC ......... *H01M 10/523* (2013.01); *B01J 29/068* (2013.01); *B01J 37/0215* (2013.01);
(Continued)

(58) Field of Classification Search
CPC ......... H01M 10/0525; H01M 10/4235; H01M 10/0567; H01M 10/523; H01M 4/628; B01J 37/0215; B01J 29/068; Y02E 60/10
(Continued)

(56) References Cited

U.S. PATENT DOCUMENTS

| 5,580,680 A * | 12/1996 | Chaloner-Gill ... H01M 10/0565 429/305 |
| 6,069,266 A * | 5/2000 | Kalchauer ................ C07F 7/16 556/473 |

(Continued)

FOREIGN PATENT DOCUMENTS

| CN | 111430644 A | 7/2020 |
| DE | 102019134104 A1 | 7/2020 |

OTHER PUBLICATIONS

Shin, Jee-Sun et al., "Effect of $Li_2CO_3$ additive on gas generation in lithium-ion batteries," *Journal of Power Sources*, 109, (2002) pp. 47-52.
(Continued)

*Primary Examiner* — Jonathan G Jelsma
*Assistant Examiner* — Omar M Kekia
(74) *Attorney, Agent, or Firm* — Harness, Dickey & Pierce, P.L.C.

(57) ABSTRACT

A lithium ion battery is provided that includes a positive electrode, a negative electrode, and a separator disposed between the positive electrode and the negative electrode. One or more of the separator, positive electrode, and negative electrode includes a transition metal compound capable of catalyzing any gaseous reactants formed in the lithium ion battery to form a liquid. The transition metal compound may include ruthenium (Ru). In certain variations, the lithium ion battery includes an electrolyte that is a conductive medium for lithium ions to move between the positive electrode and the negative electrode. The electrolyte comprises a transition metal compound capable of catalyzing a reaction of any gaseous reactants to form a liquid.

20 Claims, 2 Drawing Sheets

(51) Int. Cl.
*B01J 29/068* (2006.01)
*H01M 10/0525* (2010.01)
*H01M 10/0567* (2010.01)
*H01M 4/62* (2006.01)
*H01M 10/42* (2006.01)

(52) U.S. Cl.
CPC ........ *H01M 10/0525* (2013.01); *H01M 4/628* (2013.01); *H01M 10/0567* (2013.01); *H01M 10/4235* (2013.01); *Y02E 60/10* (2013.01)

(58) Field of Classification Search
USPC .......................................................... 429/57
See application file for complete search history.

(56) References Cited

U.S. PATENT DOCUMENTS

| | | | |
|---|---|---|---|
| 6,680,143 B2 | 1/2004 | Thackeray et al. | |
| 8,187,752 B2 | 5/2012 | Buckley et al. | |
| 8,277,974 B2 | 10/2012 | Kumar et al. | |
| 8,389,160 B2 | 3/2013 | Venkatachalam et al. | |
| 8,394,534 B2 | 3/2013 | Lopez et al. | |
| 8,465,873 B2 | 6/2013 | Lopez et al. | |
| 8,475,959 B2 | 7/2013 | Venkatachalam et al. | |
| 8,535,832 B2 | 9/2013 | Karthikeyan et al. | |
| 8,663,849 B2 | 3/2014 | Venkatachalam et al. | |
| 8,673,490 B2 | 3/2014 | Kumar et al. | |
| 8,697,288 B2 | 4/2014 | Buckley et al. | |
| 8,741,484 B2 | 6/2014 | Karthikeyan et al. | |
| 8,765,306 B2 | 7/2014 | Amiruddin et al. | |
| 8,916,294 B2 | 12/2014 | Kumar et al. | |
| 8,928,286 B2 | 1/2015 | Amiruddin et al. | |
| 8,993,177 B2 | 3/2015 | Amiruddin et al. | |
| 9,012,073 B2 | 4/2015 | Kumar | |
| 9,083,062 B2 | 7/2015 | Kumar et al. | |
| 9,166,222 B2 | 10/2015 | Amiruddin et al. | |
| 9,190,694 B2 | 11/2015 | Lopez et al. | |
| 9,601,228 B2 | 3/2017 | Deng et al. | |
| 9,843,041 B2 | 12/2017 | Lopez et al. | |
| 9,923,195 B2 | 3/2018 | Amiruddin et al. | |
| 10,056,644 B2 | 8/2018 | Kumar et al. | |
| 2005/0031942 A1 | 2/2005 | Hennige et al. | |
| 2006/0051673 A1 | 3/2006 | Johnson et al. | |
| 2012/0276455 A1* | 11/2012 | Nishimura | H01M 4/621 429/232 |
| 2013/0296586 A1* | 11/2013 | Seubsai | C07D 301/03 549/523 |
| 2015/0183706 A1* | 7/2015 | Hembre | C07C 51/36 252/182.12 |
| 2017/0149105 A1* | 5/2017 | Kim | H01M 4/382 |

OTHER PUBLICATIONS

Teng, Xin et al., "In Situ Analysis of Gas Generation in Lithium-Ion Batteries with Different Carbonate-Based Electrolytes," *ACS Appl. Mater. Interfaces*, 7 (41), p. 22751-22755 (Sep. 29, 2015); DOI: 10.1021acsami.5b08399; Abstract Only.

\* cited by examiner

ELIMINATION OF GASEOUS REACTANTS IN LITHIUM ION BATTERIES

INTRODUCTION

This section provides background information related to the present disclosure which is not necessarily prior art.

Depending on the chemistry of the active materials and intercalation compounds used in lithium ion batteries, and on the chemical nature of the electrolyte and other factors, certain combinations of materials in lithium ion batteries can be subject to swelling during use. The swelling may be due to the breakdown of components, such as the electrolyte solvent, that generates gaseous products under certain operating conditions. When a battery exhibits swelling from the production of gaseous reactants, it can potentially compromise the life of the cell and lead to cycle life degradation. Therefore, the potential for gas formation can make certain material combinations a less desirable choice for commercial use. It would be desirable to improve lithium ion batteries by avoiding or suppressing gas formation, while employing desirable active materials that provide durable batteries with sustained high capacity, high discharge rates, and long life.

SUMMARY

This section provides a general summary of the disclosure, and is not a comprehensive disclosure of its full scope or all of its features.

In certain variations, the present disclosure provides a lithium ion battery including a positive electrode, a negative electrode, and a separator disposed between the positive electrode and the negative electrode. One or more of the separator, positive electrode, and negative electrode includes a transition metal compound capable of catalyzing any gaseous reactants formed in the lithium ion battery to form a liquid.

In certain aspects, the gaseous reactants are selected from the group consisting of: methane, hydrogen, carbon monoxide, carbon dioxide, ethylene, ethane, and combinations thereof.

In certain aspects, the gaseous reactants include hydrogen chloromethane.

In certain aspects, the transition metal compound includes an element selected from the group consisting of: ruthenium (Ru), titanium (Ti), molybdenum (Mo), nickel (Ni), cobalt (Co), palladium (Pd), iridium (Ir), and combinations thereof.

In certain further aspects, the transition metal compound includes ruthenium (Ru).

In certain aspects, one of the positive electrode, the negative electrode, and the separator includes greater than or equal to about 10 ppm to less than or equal to about 5% by weight of the transition metal compound.

In certain aspects, the transition metal compound is supported on an inert material.

In certain further aspects, the lithium ion battery further includes an electrolyte. The transition metal compound is supported on a zeolite and provided as one or more of the following: a coating on the separator, an inactive component distributed in the positive electrode, an additive particle in the electrolyte, or combinations thereof.

In other variations, the present disclosure provides a lithium ion battery including a positive electrode, a negative electrode, and a liquid electrolyte that is a conductive medium for lithium ions to move between the positive electrode and the negative electrode. The liquid electrolyte includes a transition metal compound capable of catalyzing a reaction of any gaseous reactants to form a liquid.

In certain aspects, the transition metal compound includes an element selected from the group consisting of: ruthenium (Ru), titanium (Ti), molybdenum (Mo), nickel (Ni), cobalt (Co), palladium (Pd), iridium (Ir), and combinations thereof.

In certain aspects, the transition metal compound is soluble in the liquid electrolyte and the liquid electrolyte includes an organic solvent, a lithium salt, and greater than or equal to about 10 ppm to less than or equal to about 5% by weight of the transition metal compound.

In certain aspects, the transition metal compound is a compound of ruthenium.

In certain further aspects, the compound is selected from the group consisting of bis(cyclopentadienyl)ruthenium, ruthenium (III) acetylacetonate ($Ru(CH_3COCHCOCH_3)_3$), ruthenium carbonyl ($Ru_3(CO)_{12}$), ruthenium (IV) oxide ($RuO_2$), ruthenium (III) 2,4-pentanedionate, dichloro(mesitylene)ruthenium(II) dimer ($C_{18}H_{24}Cl_4Ru_2$), bis(ethylcyclopentadienyl)ruthenium(II) ($C_7H_9RuC_7H_9$), bis(2,4-dimethylpentadienyl)ruthenium(II) ($Ru(C_7H_{11})_2$), and combinations thereof.

In certain aspects, one of the positive electrode and the negative electrode also includes a transition metal compound capable of catalyzing the reaction of gaseous reactants to form a liquid.

In yet other variations, the present disclosure provides a lithium ion battery including a positive electrode, a negative electrode, a separator disposed between the positive electrode and the negative electrode, and an electrolyte including a lithium salt, a solvent, and a compound including ruthenium (Ru). The electrolyte provides a conductive medium for lithium atoms to move between the positive electrode and the negative electrode. The compound including ruthenium catalyzes the gaseous reactants to form a liquid.

In certain aspects, the compound including ruthenium (Ru) is soluble in the electrolyte, so that the electrolyte includes the compound.

In certain aspects, the electrolyte includes 10 ppm to 5% by weight of ruthenium.

In certain aspects, the compound including ruthenium (Ru) is insoluble in the electrolyte and is disposed on a surface of the positive electrode, the negative electrode, or on the separator.

In certain aspects, the at least one of the positive electrode and negative electrode each includes greater than or equal to about 10 ppm to less than or equal to about 5% by weight of ruthenium.

In certain aspects, the compound including ruthenium (Ru) is selected from the group consisting of bis(cyclopentadienyl)ruthenium, ruthenium (III) acetylacetonate ($Ru(CH_3COCHCOCH_3)_3$), ruthenium carbonyl ($Ru_3(CO)_{12}$), ruthenium (IV) oxide ($RuO_2$), ruthenium (III) 2,4-pentanedionate, dichloro(mesitylene) ruthenium(II) dimer ($C_{18}H_{24}Cl_4Ru_2$), bis(ethylcyclopentadienyl) ruthenium(II) ($C_7H_9RuC_7H_9$), bis(2,4-dimethylpentadienyl)ruthenium(II) ($Ru(C_7H_{11})_2$), and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
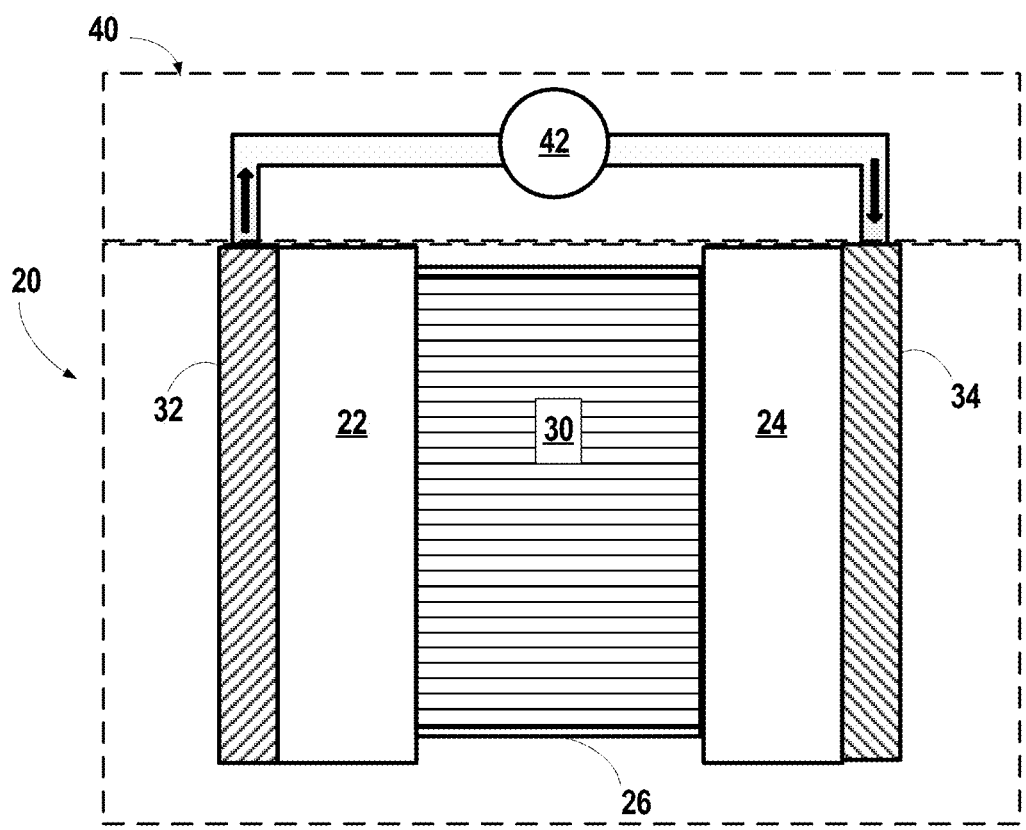
FIG. 1 is a schematic view of an electrochemical cell (e.g., lithium ion battery).

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," "has," "having," and the like are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In accordance with certain aspects of the present disclosure, a battery system has been developed with that minimizes or avoids swelling by eliminating in-situ gas generation or by consuming gas in autocatalytic reactions that can effectively convert the generated gases to liquid products. In battery systems of the current teachings, catalysts are introduced into the battery through electrolyte additives or surface coatings to catalyze the reaction of gas molecules such as hydrogen and methane to liquid products such as methyl formate, acetic acid, and so on.

According to one embodiment there is provided a lithium ion battery that has a positive electrode, a negative electrode, and a separator disposed between the positive and the negative electrodes, and wherein one or more of the separator, positive electrode, and negative electrode contains a transition metal compound capable of catalyzing the reaction of gaseous reactants to form a liquid product. In non-limiting fashion, the gaseous reactants are selected from methane, hydrogen, carbon monoxide, carbon dioxide, hydrogen chloromethane, ethylene, and ethane. Hydrogen and methane are commonly formed. Thus, the transition metal compound may be considered to be a transition metal catalyst compound. Without limitation, the transition metal compound can comprise an element selected from the group consisting of: an element selected from the group consisting of: ruthenium (Ru), titanium (Ti), molybdenum (Mo), nickel (Ni), cobalt (Co), palladium (Pd), iridium (Ir), and combinations thereof. Ruthenium is preferred in some embodiments.

An exemplary schematic illustration of an electrochemical cell (e.g., battery) that cycles lithium ions is shown in FIG. 1. The battery 20 includes a negative electrode 22, a positive electrode 24, and a separator 26 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte solution 30 contained in the separator 26 towards the positive electrode 24. The electrons flow through the external circuit 40 and the lithium ions migrate across the separator 26 containing the electrolyte solution 30 to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. The connection of an external electrical energy source to the battery 20 compels the otherwise non-spontaneous oxidation of intercalated lithium at the negative electrode 22 to produce electrons and lithium ions. The electrons, which flow back towards the positive electrode 24 through the external circuit 40, and the lithium ions, which are carried by the electrolyte solution 30 across the separator 26 back towards the positive electrode 24, reunite at the positive electrode 24 and replenish it with lithium for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium ion battery configurations, each of the negative electrode current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. Further, the separator 26 operates as an electrical insulator by being sandwiched between the negative electrode 22 and the positive electrode 24 to prevent physical contact and thus, the occurrence of a short circuit. The separator 26, in addition to providing a physical barrier between the two electrodes 22, 24, acts like a sponge that contains the electrolyte solution in a network of open pores during the cycling of lithium ions, to facilitate functioning of the battery 20.

The battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output, energy, and power if it is required by the load device 42.

Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

In various aspects of the present disclosure, the positive electrode, the negative electrode, or the separator of the electrochemical cell/battery comprises at least 1 ppm, and optionally greater than or equal to about 10 ppm to less than or equal to about 5% by weight of the transition metal compound. The transition metal compound can be supported on an inert material, for example on a zeolite.

In another embodiment, a catalyst is provided in the electrolyte that provides a conductive medium for lithium ions to move between the electrodes. Thus, the current teachings provide a lithium ion battery that has a positive electrode, a negative electrode, and a separator disposed between the positive and negative electrodes; further, an electrolyte that comprises a transition metal compound capable of catalyzing the reaction of gaseous reactants to form a liquid. Examples of transition metal compounds include compounds of ruthenium (Ru), titanium (Ti), molybdenum (Mo), nickel (Ni), cobalt (Co), palladium (Pd), iridium (Ir), and combinations thereof. The transition metal compound is a compound of ruthenium (Ru) in some embodiments.

In certain variations, the electrolyte comprises an organic solvent, a lithium salt, and greater than or equal to about 10 ppm to less than or equal to about 5% by weight of the transition metal compound that acts as a catalyst for the reaction of gaseous reactants to form a liquid product. The transition metal compound is soluble in the electrolyte.

Examples of ruthenium compounds that may be used in various embodiments of the current teachings include bis (cyclopentadienyl)ruthenium, ruthenium (III) acetylacetonate ($Ru(CH_3COCHCOCH_3)_3$), ruthenium carbonyl ($Ru_3(CO)_{12}$), ruthenium (IV) oxide ($RuO_2$), ruthenium (III) 2,4-pentanedionate, dichloro(mesitylene) ruthenium(II) dimer ($C_{18}H_{24}Cl_4Ru_2$), bis(ethylcyclopentadienyl) ruthenium(II) ($C_7H_9RuC_7H_9$), bis(2,4-dimethylpentadienyl) ruthenium(II) ($Ru(C_7H_{11})_2$), and any combinations thereof When the electrolyte contains a catalyst, it is possible to provide a battery or battery cell wherein one or more of the positive electrode, the negative electrode, and the separator also comprises a transition metal compound capable of catalyzing the reaction of gaseous reactants to form a liquid.

In a particular embodiment, a lithium ion battery of the current teachings has a positive electrode, a negative electrode, and a separator disposed between the positive electrode and the negative electrode, in addition to an electrolyte that provides a conductive medium for lithium atoms to move between the electrodes, wherein the lithium battery comprises a ruthenium compound that catalyzes the reaction of gaseous reactants to form a liquid. The ruthenium compound can be soluble so that it is found in the electrolyte. Alternatively or in addition, the ruthenium compound is insoluble in the electrolyte and is disposed on the surface of the positive electrode, the negative electrode, or on the separator. The insoluble ruthenium compound can also be supported on an inert support such as a zeolite.

In various embodiments, the electrolyte comprises greater than or equal to about 10 ppm to less than or equal to about 5% by weight of a ruthenium. In these or other embodiments, at least one of the positive electrode and negative electrode comprises greater than or equal to about 10 ppm to less than or equal to about 5% by weight of ruthenium. Ruthenium compounds include those described above.

Here and elsewhere, unless stated otherwise, ppm by weight or percentage by weight of the catalysts described herein refers to by weight of the total binder and active material on the positive or negative electrode, or by total weight of the electrolyte.

Lithium ion batteries are modified by introducing a catalyst into the battery cells, either as additives in the electrolyte, or as heterogeneous catalysts surface coated on the electrodes or separator. The presence of the catalysts allows the battery system to function with in-situ gas elimination by means of autocatalytic reactions that can effectively convert gaseous reactants (such as hydrogen, methane and the like) to liquid products. Elimination of the gaseous reactants eliminates swelling of the battery cells caused by parasitic reactions. In this way, safety and battery life are increased.

Catalysts

Figure 2A:
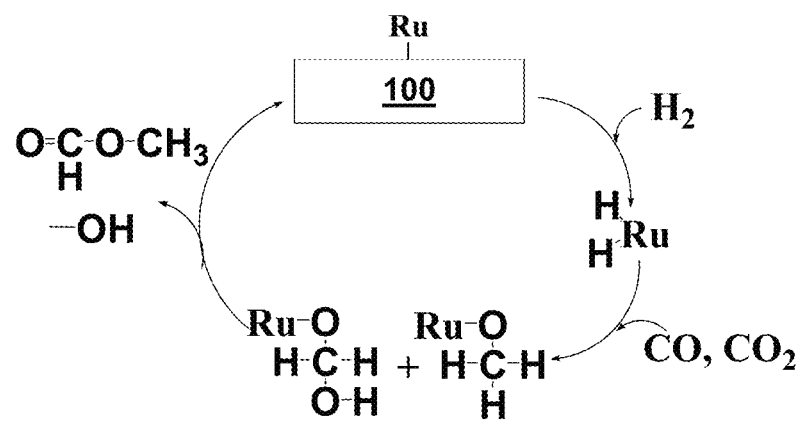
FIGS. 2A and 2B show proposed mechanisms for reactions to remove hydrogen or methane from the lithium ion batteries according to certain aspects of the present disclosure.
Figure 2B:
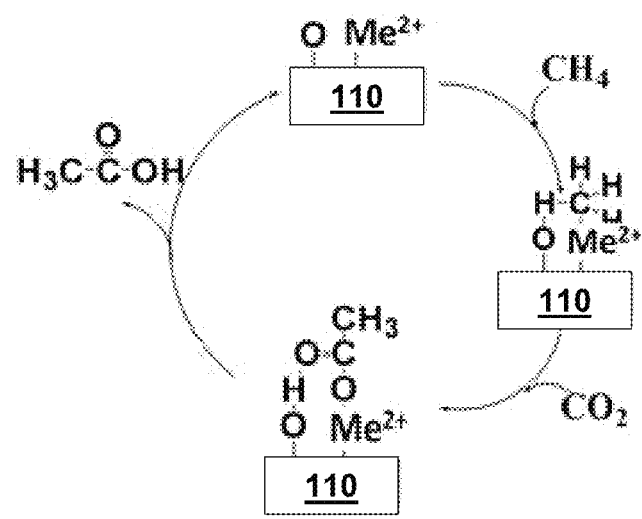

The catalysts are transition metal compounds that are capable of catalyzing reaction of gaseous reactants to form a liquid. Gases formed as the by-product of battery cell operation, and in particular decomposition of electrolyte solvents during operation of the battery, include hydrogen, methane, carbon dioxide, carbon monoxide, ethylene, and ethane. While the invention is not to be limited by theory, FIGS. 2A and 2B illustrate proposed reactions schemes by which the chosen catalysts act to remove hydrogen or methane from the electrochemical cell, in non-limiting fashion. In FIG. 2A, a catalyst 100 comprising ruthenium (Ru) is shown to react with gaseous hydrogen ($H_2$) gas and carbon monoxide/carbon dioxide to convert it to a liquid (water ($OH/H_2O$) or acetic acid ($COOHCH_3$)). Catalysts include, without limitation compounds containing metals ruthenium (Ru), titanium (Ti), molybdenum (Mo), nickel (Ni), palladium (Pd), and/or iridium (Ir). These catalysts can be homogeneous catalysts provided as soluble compounds dissolved in the electrolyte solvent, or as heterogeneous (insoluble) catalysts that are surface coated upon the positive electrode, the negative electrode, or the separator in a lithium ion cell.

In addition to homogeneous and heterogeneous catalysts, the transition metal compound can also be supported on a carrier such as a zeolite or other inert material, including silica and other aluminosilicates besides the zeolites. In FIG. 2B, a catalyst (metal $Me^{2+}$) is provided on a catalyst support 110, like a zeolite. The catalyst reacts with gaseous methane ($CH_4$) and $CO_2$ to form a liquid (e.g., acetic acid ($COOHCH_3$)). In certain aspects, Me may be ruthenium (Ru), titanium (Ti), molybdenum (Mo), nickel (Ni), and the like as discussed above.

To prepare the lithium ion batteries, the electrolyte, electrode, and/or separator is essentially doped with small amounts of the catalyst compound. The weight incorporated into the lithium ion battery is sufficient to adequately catalyze the reaction of gaseous reactants to form a liquid, but without being present at too high a level that would interfere with operation of the electrodes in the cell. As a general rule, the catalyst is doped into the battery at a level of about 10 parts per million to up to about 5% by weight where the ppm and the percentage by weight are based on the weight of the active components of the battery. For the negative electrode, the active components include the anode active material as well as any binder present. For the positive electrode, the active components include the cathode active material and any binder present. The level of doping into the electrolyte solvent is based on the weight of the electrolyte. In various embodiments, the amount of doping is on the level of greater than or equal to about 0.5 to less than or equal to about 2% by weight, for example, greater than or equal to about 0.5 to less than or equal to about 1% by weight.

The transition metal compounds that are chosen to be used as catalysts are different from the lithium transition metal compounds that are commonly used as active materials for the electrodes of the lithium ion batteries. In certain variations, the transition metal may be ruthenium or palladium. When the transition metal is ruthenium, non-limiting examples of catalyst include the ruthenium compound is selected from the group consisting of bis(cyclopentadienyl)

ruthenium, ruthenium (III) acetylacetonate (Ru(CH$_3$COCHCOCH$_3$)$_3$), ruthenium carbonyl (Ru$_3$(CO)$_{12}$), ruthenium (IV) oxide (RuO$_2$), ruthenium (III) 2,4-pentanedionate, dichloro(mesitylene)ruthenium(II) dimer (C$_{18}$H$_{24}$Cl$_4$Ru$_2$), bis(ethylcyclopentadienyl)ruthenium(II) (C$_7$H$_9$RuC$_7$H$_9$), bis(2,4-dimethylpentadienyl)ruthenium(II) (Ru(C$_7$H$_{11}$)$_2$), and combinations thereof.

If the transition metal compound (catalyst) is soluble and dissolves in one of the solvents used for the electrolyte, the catalyst is said to be homogeneous. Homogeneous catalysts can be incorporated into lithium ion batteries of the current disclosure by dissolving them in the solvent that makes up the electrolyte. If the transition metal compound (catalyst) is not soluble in one of the solvents used for the electrolyte, it is a heterogeneous catalyst and can be applied by surface coating one of the electrodes or the separator of the lithium ion cell. Various techniques are available to apply heterogeneous catalysts to the surface of the electrode or separators. These include vapor deposition processes like magnetron sputter, electron beam evaporation, thermal evaporation, laser arc and laser assisted deposition, ion beam sputtering, inductively coupled plasma deposition, atmospheric plasma deposition, microwave assisted chemical vapor deposition or ion layer source deposition, atomic layer deposition, and the like.

It is also possible to incorporate catalysts into an electrode, whether or not the catalyst is soluble in the electrolyte solvent. For example, the catalyst can be mixed together with the electrode active materials and optional binder compounds during formation of the electrode. In this embodiment, the catalyst is provided not solely on the surface of the electrode, but also incorporated into the bulk of the electrode.

To effectively convert gaseous reactants to liquid products in the battery, it suffices to provide the lithium ion battery with low levels of these catalysts as mentioned. The overall structure and composition of the lithium ion battery is not particularly restricted, except insofar that certain lithium ion battery chemistries and configurations tend to exhibit a higher degree of gas generation than others. This has been observed for example in the lithium nickel cobalt active materials where the incentive is to add as much nickel-rich materials as possible, but at the cost of higher gas generation, which is believed to be due to the higher energy density of the nickel compound. Further description of various aspects of lithium ion batteries for use with these teachings follows.

Lithium Ion Batteries

The batteries described herein generally are lithium ion batteries in which generally a non-aqueous electrolyte comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or the like during discharge such that the positive electrode functions as a cathode, which neutralizes the lithium ions with the consumption of electrons. Upon recharging of the secondary cell, the flow of lithium ions is reversed through the cell with the negative electrode taking up lithium and with the positive electrode releasing lithium as lithium ions.

Negative Electrodes

The negative electrodes described herein can be incorporated into various commercial battery cell designs. While the negative electrode can be used in batteries for primary, or single charge use, the resulting batteries generally have desirable cycling properties for secondary battery use over multiple cycling of the cells. The battery cells can comprise a single negative electrode structure or a plurality of negative electrode structures assembled in parallel and/or series electrical connection(s). For example, the electrodes described herein can be stacked with the separator between them, and the resulting stacked structure can be rolled into a cylindrical, prismatic, or other reasonable configuration to form the battery structure. Appropriate electrically conductive tabs can be welded or the like to the current collectors, and the resulting jellyroll or stacked structure can be placed into a metal canister or polymer package, which can be flexible, with the negative tab and positive tab welded to appropriate external contacts. Electrolyte is added to the canister or package, and the canister or package is sealed to complete the battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as Li$_x$TiO$_2$, 0.5<<x≤1 or Li$_{1+x}$Ti$_{2-x}$O$_4$, 0≤x≤⅓. Additional negative electrode materials are described in U.S. Pat. No. 9,012,073 to Kumar, entitled "Composite Compositions, Negative Electrodes with Composite Compositions and Corresponding Batteries," and U.S. Pat. No. 8,277,974 to Kumar et al., entitled "Lithium Ion Batteries with Particular Negative Electrode Compositions," both of which are useful for providing background information and are incorporated herein by reference.

Positive Electrodes

In general, the positive electrode comprises a particulate composition that intercalates or alloys with lithium ions during discharge of the battery. The positive electrode can comprise a binder to contribute to the integrity of the electrode. The positive electrode can further comprise electrically conductive particles, such as graphite particles, graphite or carbon fibers, carbon fibrils, carbon whiskers, carbon black, silver particles or the like to improve electrical conduction in the electrode. Suitable active compositions for the positive electrode include, for example, lithium cobalt oxide, lithium nickel oxide, lithium manganese oxide and the like. Also included as suitable active compositions are NMC, which is a combination of nickel (Ni), manganese (Mn), and cobalt (Co). Phosphates such as LiFePO$_4$ are also used.

A class of desirable high energy density positive electrode active compositions is believed to have a composite crystal structure in which, for example, a Li$_2$MnO$_3$ is structurally integrated with either a layered LiMnO$_2$ component or a spinel LiMn$_2$O$_4$ component or similar composite compositions with the manganese ions substituted with other transition metal ions with equivalent oxidation states. In some embodiments, the positive electrode material can be represented in two component notation as xLiMO$_2$.(1−x)Li$_2$M'O$_3$ where M is one or more of trivalent metal ions with at least one ion being Mn$^{+3}$, Co$^{+3}$, or Ni$^{3+}$ and where M' is one or more tetravalent metal ions and 0<x<1. These compositions are described further in U.S. Pat. No. 6,677,082 to Thackeray et al., entitled "Lithium Metal Oxide Electrodes for Lithium Cells and Batteries" and U.S. Pat. No. 6,680,143 to Thackeray et al., entitled "Lithium Metal Oxide Electrodes for Lithium Cells and Batteries," both of which are useful for background information and are incorporated herein by reference. Thackeray identified Mn, Ti and Zr as being of particular interest as M' and Mn and Ni for M. In other embodiments, the layered lithium rich compositions can be represented in two component notation as $xLi_2MnO_3 \cdot (1-x)LiMn_{2-y}M_yO_4$, where M is one or more metal cations. These compositions are described further in published U.S. patent application 2006/0051673 to Johnson et al., entitled "Manganese Oxide Composite Electrodes for Lithium Batteries," incorporated herein by reference.

Electrode Construction

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidene fluoride (PVDF), polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof and mixtures thereof. The positive electrode active material loading in the binder can be large, such as greater than about 80 weight percent. For example, the binder can be present at a level of greater than or equal to about 1 to less than or equal to about 20% by weight, or more narrowly greater than or equal to about 1 to less than or equal to about 10%, greater than or equal to about 1 to less than or equal to about 8%, greater than or equal to about 1 to less than or equal to about 5%, greater than or equal to about 1 to less than or equal to about 7%, greater than or equal to about 1 to less than or equal to about 5%, and optionally greater than or equal to about 1 to less than or equal to about 3% by weight binder. To form the electrode, the powders can be blended with the polymer in a suitable liquid, such as a solvent for the polymer. The resulting paste can be pressed into the electrode structure.

The positive electrode composition generally also comprises an electrically conductive powder distinct from the electroactive composition. Suitable supplemental electrically conductive powders include, for example, graphite, carbon black, graphite or carbon powders, carbon fibrils, carbon whiskers, metal powders, such as silver powders, carbon fibers, metal fibers, such as stainless steel fibers, and the like, and combinations thereof. While the metal alloy/intermetallic compositions described herein generally provide for electrical conductivity within the negative electrode structure, the negative electrode can optionally further comprise supplemental electrically conductive powders, such as the conductive powders above. In some embodiments, the negative electrode comprises no more than about 15 weight percent supplemental electrically conductive powders, in other embodiments no more than about 10 weight percent, and in additional embodiments from about 0.5 to about 8 weight percent supplemental electrically conductive powders. A person of ordinary skill in the art will recognize that additional ranges of conductive powder composition within the explicit ranges above are contemplated and within the present disclosure. While the supplemental electrically conductive compositions are described as powders, these materials lose their powder character following incorporation into the electrode where the associated particles of the supplemental electrically conductive material become a component of the resulting electrode structure.

Current Collectors

The positive electrode generally is associated with an electrically conductive current collector to facilitate the flow of electrons between the electrode and an exterior circuit. The current collector can comprise metal, such as a metal foil, a metal grid or screen, or expanded metal. Expanded metal current collectors refer to metal grids with a greater thickness such that a greater amount of electrode material is placed within the metal grid. In some embodiments, the current collector can be formed from nickel, aluminum, stainless steel, titanium or the like. The electrode material can be cast in contact with the current collector.

For example, in some embodiments, the electrode material in contact with the current collector foil or other structure can be subjected to a pressure from about 2 to about 10 kg/cm$^2$ (kilograms per square centimeter). The pressed structure can be dried, for example in an oven, to remove the solvent from the electrode. Metal foils can be used as current collectors. For example, copper foils can be used as current collectors for negative electrodes and aluminum foil can be used as positive electrode current collectors. Pastes or slurries of the cathode materials can be coated onto both sides of the foil. Then, the electrodes can be pressed using calendaring rolls, a press with a die or other suitable processing apparatus to compress the electrodes to a desired thickness. The positive electrodes can have an active material particle loading on each side of the current collector from 20 mg/cm$^2$ to 50 mg/cm$^2$ The positive electrodes can have a density of at least 2.5 grains per milliliter (g/mL), in further embodiments at least about 2.8 g/ml and in additional embodiments from about 3.0 g/mL to about 3.5 g/mL. A person of ordinary skill in the art will recognize that additional ranges of active material loading within the explicit range above are contemplated and are within the present disclosure.

In some embodiments, the negative electrodes can be similarly prepared with respect to contact of the electrode composition with the current collector as well as drying and pressing the resulting structure. In embodiments in which the negative electrode comprises a foamed electrically conductive current collector, the resulting electrode may not have a separate metal foil or metal grid current collector element.

Separator

The separator is located between the positive electrode and the negative electrode. The separator is electrically insulating while providing for at least selected ion conduction between the two electrodes. A variety of materials can be used as separators. For example, glass fibers formed into a porous mat can be used as a separator. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. In addition, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

Electrolyte

Electrolytes for lithium ion batteries can comprise one or more selected lithium salts. Appropriate lithium salts generally have inert anions. A non-limiting list of examples of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis-(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bis(trifluoromethanesulfonimide) (LITFSI) ($LiN(CF_3SO_2)_2$); lithium fluorosulfonylimide ($LiN(FSO_2)_2$) (LIFSI); and combinations thereof. In certain variations, the lithium salt is selected from $LiPF_6$, LiFSI, LiTFSI, and combinations thereof. Traditionally, the electrolyte comprises a 1 M concentration of the lithium salts. In some embodiments, conventional electrolyte compositions can be used, such as a 1 molar solution of $LiPF_6$ in a blend of ethylene carbonate and dimethylcarbonate at a 1 to 1 by volume ratio.

For lithium ion batteries, a non-aqueous liquid is generally used to dissolve the lithium salt(s). The solvent is generally inert and does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof.

Cell Designs

The electrodes described herein can be incorporated into various commercial cell designs. For example, the cathode compositions can be used for prismatic shaped cells, wound cylindrical cells, coin cells, pouch cells or other reasonable cell shapes. The cells can comprise a single electrode structure of each polarity or a stacked structure with a plurality of positive electrodes and negative electrodes assembled in parallel and/or series electrical connection(s). In particular, the battery can comprise a stack of alternating positive electrodes and negative electrodes with separators between them. Generally, the plurality of electrodes is connected in parallel to increase the current at the voltage established by a pair of a positive electrode and a negative electrode. While the positive electrode active materials can be used in batteries for primary, or single charge use, the resulting batteries generally have desirable cycling properties for secondary battery use over multiple cycling of the cells.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister or package is sealed to complete the battery.

An example of heterogeneous catalysts would be a transition metal compound that is bound to zeolite or other carrier where they can be as the ceramic coating on the separator, the inactive component in the positive electrode, and/or the additive particles in the electrolyte.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lithium ion battery comprising:
   a positive electrode;
   a negative electrode; and
   a separator disposed between the positive electrode and the negative electrode, wherein the separator comprises a first transition metal compound capable of catalyzing any gaseous reactants formed in the lithium ion battery to form a liquid and at least one of the positive electrode and the negative electrode comprises a second transition metal compound capable of catalyzing any gaseous reactants formed in the lithium ion battery to form a liquid, wherein the first and second transition metal compounds are supported on an inert material.

2. The lithium ion battery according to claim 1, wherein the gaseous reactants are selected from the group consisting of: methane, hydrogen, carbon monoxide, carbon dioxide, ethylene, ethane, and combinations thereof.

3. The lithium ion battery according to claim 1, wherein the gaseous reactants comprise chloromethane.

4. The lithium ion battery according to claim 1, wherein each of the first and second transition metal compounds comprise an element selected from the group consisting of: ruthenium (Ru), titanium (Ti), molybdenum (Mo), nickel (Ni), cobalt (Co), palladium (Pd), iridium (Ir), and combinations thereof.

5. The lithium ion battery according to claim 4, wherein at least one of the first and second transition metal compounds comprise ruthenium (Ru).

6. The lithium ion battery according to claim 1, wherein the separator comprises greater than or equal to about 10 ppm to less than or equal to about 5% by weight of the first transition metal compound.

7. The lithium ion battery according to claim 1, further comprising an electrolyte, wherein the first transition metal compound is supported on a zeolite and provided as a coating on the separator.

8. The lithium ion battery according to claim 1, wherein the second transition metal compound is an inactive component distributed in the positive electrode.

9. The lithium ion battery according to claim 1, wherein the first transition metal compound is different from the second transition metal compound.

10. A lithium ion battery comprising:
    a positive electrode;
    a negative electrode; and
    a liquid electrolyte that is a conductive medium for lithium ions to move between the positive electrode and the negative electrode, wherein the liquid electrolyte comprises a first transition metal compound capable of catalyzing a reaction of any gaseous reactants to form a liquid, and one of the positive electrode and the negative electrode comprises a second transition metal compound capable of catalyzing the reaction of gaseous reactants to form a liquid.

11. The lithium ion battery according to claim 10, wherein each of the first and second transition metal compounds comprise an element selected from the group consisting of: ruthenium (Ru), titanium (Ti), molybdenum (Mo), nickel (Ni), cobalt (Co), palladium (Pd), iridium (Ir), and combinations thereof.

12. The lithium ion battery according to claim 10, wherein the first transition metal compound is soluble in the liquid electrolyte and the liquid electrolyte comprises an organic solvent, a lithium salt, and greater than or equal to about 10 ppm to less than or equal to about 5% by weight of the transition metal compound.

13. The lithium ion battery according to claim 10, wherein at least one of the first and second transition metal compounds comprise ruthenium.

14. The lithium ion battery according to claim 13, wherein the at least one of the first and second transition metal compounds is selected from the group consisting of bis(cyclopentadienyl)ruthenium, ruthenium (III) acetylacetonate ($Ru(CH_3COCHCOCH_3)_3$), ruthenium carbonyl ($Ru_3(CO)_{12}$), ruthenium (IV) oxide ($RuO_2$), ruthenium (III) 2,4-pentanedionate, dichloro(mesitylene)ruthenium(II) dimer ($C_{18}H_{24}Cl_4Ru_2$), bis(ethylcyclopentadienyl)ruthenium(II) ($C_7H_9RuC_7H_9$), bis(2,4-dimethylpentadienyl)ruthenium(II) ($Ru(C_7H_{11})_2$), and combinations thereof.

15. A lithium ion battery comprising:
a positive electrode;
a negative electrode, wherein at least one of the positive electrode and the negative electrode comprises a first transition metal compound capable of catalyzing the reaction of gaseous reactants to form a liquid;
a separator disposed between the positive electrode and the negative electrode, wherein the separator comprises a second transition metal compound capable of catalyzing the reaction of gaseous reactants to form a liquid; and
an electrolyte comprising a lithium salt, a solvent, and a compound comprising ruthenium (Ru), wherein the electrolyte provides a conductive medium for lithium atoms to move between the positive electrode and the negative electrode, wherein the compound comprising ruthenium catalyzes gaseous reactants in the lithium ion battery to form a liquid.

16. The lithium ion battery according to claim 15, wherein the compound comprising ruthenium (Ru) is soluble in the electrolyte, so that the electrolyte comprises the compound.

17. The lithium ion battery according to claim 16, wherein the electrolyte comprises 10 ppm to 5% by weight of ruthenium.

18. The lithium ion battery according to claim 15, wherein the compound comprising ruthenium (Ru) is insoluble in the electrolyte and is disposed on a surface of at least one of the positive electrode, the negative electrode, and the separator.

19. The lithium ion battery according to claim 15, wherein the at least one of the positive electrode and negative electrode comprises greater than or equal to about 10 ppm to less than or equal to about 5% by weight of ruthenium.

20. The lithium ion battery according to claim 15, wherein the compound comprising ruthenium (Ru) is selected from the group consisting of bis(cyclopentadienyl)ruthenium, ruthenium (III) acetylacetonate ($Ru(CH_3COCHCOCH_3)_3$), ruthenium carbonyl ($Ru_3(CO)_{12}$), ruthenium (IV) oxide ($RuO_2$), ruthenium (III) 2,4-pentanedionate, dichloro(mesitylene)ruthenium(II) dimer ($C_{18}H_{24}Cl_4Ru_2$), bis(ethylcyclopentadienyl)ruthenium(II) ($C_7H_9RuC_7H_9$), bis(2,4-dimethylpentadienyl)ruthenium(II) ($Ru(C_7H_{11})_2$), and combinations thereof.

* * * * *